United States Patent [19]

Fan et al.

[11] Patent Number: 5,111,512

[45] Date of Patent: May 5, 1992

[54] METHOD FOR SIGNATURE VERIFICATION

[75] Inventors: Jason Chia-Sun Fan, Adelphi, Md.; Trevor J. Hastie, Berkeley Heights, N.J.; Eyal Kishon, New York, N.Y.

[73] Assignee: AT&T Bell Laboratories, Murray Hill, N.J.

[21] Appl. No.: 699,867

[22] Filed: May 14, 1991

[51] Int. Cl.$^5$ .............................................. G06K 9/00
[52] U.S. Cl. ........................................... 382/3; 382/9
[58] Field of Search ...................................... 382/3, 9

[56] References Cited

U.S. PATENT DOCUMENTS

| | | | |
|---|---|---|---|
| 4,024,500 | 5/1977 | Herbst et al. | 340/146.3 |
| 4,040,010 | 8/1977 | Crane et al. | 382/3 |
| 4,128,829 | 12/1978 | Herbst | 340/146.3 |
| 4,454,610 | 6/1984 | Sziklai | 382/3 |
| 4,724,542 | 2/1988 | Williford | 382/3 |
| 4,789,934 | 12/1988 | Gundersen et al. | 382/3 |
| 4,901,358 | 2/1990 | Bechet | 382/3 |
| 4,972,496 | 11/1990 | Sklarew | 382/13 |
| 4,985,928 | 1/1991 | Campbell et al. | 382/3 |
| 5,022,086 | 6/1991 | Crane et al. | 382/3 |
| 5,040,222 | 8/1991 | Muraya | 382/3 |

OTHER PUBLICATIONS

*IBM Tech. Discl. Bull.* 20, 1978, "Finite State Machine Decision Procedure Model for Signature Verification", by M. Hanan, et al., pp. 3355-3360.

*IEEE Trans. Sys. Man Cybernetics* 17, 1977, "Signal Verification Experiment Based on Non-Linear Time Alignment", by M. Yasuhara, et al., pp. 212-216.

"Time Warps, String Edits, and Macromolecules: The Theory and Practice of Sequence Comparison", Addison-Wesley, 1983, pp. 125-160.

*Journal of the Royal Statistical Society*, Series B (Methodological), vol. 53, No. 2, 1991, "Procrustes Methods in the Statistical Analysis of Shape", by Colin Goodall, pp. 285, 330, 331.

*IBM J. Res. Develop.*, vol. 26, No. 6, Nov. 1982, "Cursive Script Recognition by Elastic Matching", by C. C. Tappert, pp. 765-771.

*Primary Examiner*—Leo H. Boudreau
*Assistant Examiner*—Barry Stellrecht
*Attorney, Agent, or Firm*—M. I. Finston; E. E. Pacher

[57] ABSTRACT

A method and apparatus are described for verifying handwritten, human signatures, and for permitting access to a system if such a signature is accepted. In an initializing stage, an authorized entrant submits a sample of multiple signatures. A first reference signature is selected from the sample, and a second reference signature is constructed by averaging over the sample. When a subsequent, prospective entrant submits a signature, a dynamic mismatch is calculated with respect to the first reference signature, and a shape mismatch is calculated with respect to the second reference signature. The signature is accepted if it satifies a predetermined criterion that refers to the dynamic and shape mismatch values.

6 Claims, 2 Drawing Sheets

METHOD FOR SIGNATURE VERIFICATION

FIELD OF THE INVENTION

This invention relates to the field of pattern recognition, and more specifically, to the verification of handwritten, human signatures.

ART BACKGROUND

The automatic verification of a signature is a useful way to identify a human being for purposes, e.g., of establishing his authority to complete an automated transaction, or gain control of a computer, or gain physical entry to a protected area. Signatures are particularly useful for identification because each person's signature is highly unique, especially if the dynamic properties of the signature are considered in addition to the shape of the signature. Dynamic properties include stylus pressure and velocity as functions of time. Even if a skilled forger can accurately reproduce the shape of a signature, it is unlikely that he can reproduce the dynamic properties as well.

Numerous practitioners have addressed the problem of signature verification. For example, verification methods that involve analyzing the shape of the signature are described in U.S. Pat. No. 4,985,928, issued to R. K. Campbell, et al. on Jan. 15, 1991, U.S. Pat. No. 4,972,496, issued to R. Sklarew on Nov. 20, 1990, and U.S. Pat. No. 4,454,610, issued to G. C. Sziklai on Jun. 12, 1984.

Other practitioners have addressed the dynamic properties of the signature. For example, U.S. Pat. No. 4,128,829, issued to N. M. Herbst, et al. on Dec. 5, 1978, discloses a verification method based on the acceleration and pressure signals from the signature. U.S. Pat. No. 4,901,358, issued to L. Bechet on Feb. 13, 1990, discloses a verification method based on the x and y speed signals of the signature. U.S. Pat. No. 4,024,500, issued to N. M. Herbst, et al. on May 17, 1977, discloses the use of the speed signal to separate the signature into segments, followed by shape analysis of the segments.

The use of the speed signal for segmentation, as disclosed, for example, in the Herbst '500 patent discussed above, leads to efficient shape analysis. It is also apparent from the above-cited patents that pattern matching based on the speed signal or other dynamic properties is independently useful for signature verification. By combining pattern matching based on shape analysis with such matching based on dynamic properties, signature verification could, in principle, be made more reliable. However, practitioners in the art have hitherto failed to provide a verification method which uses dynamic properties to segment the signature, performs shape analysis on the resulting segmented signature, and again uses dynamic properties for dynamic pattern-matching.

SUMMARY OF THE INVENTION

The invention involves a system having controlled access, in which access is based on signature verification. The signature of the (human) entrant is verified using the dynamic properties of the signature both to segment the signature for shape analysis and for dynamic pattern matching.

Appropriate means are provided for sampling entrant signatures and facilitating their storage in digital form. Exemplary means for this purpose comprise a transductive tablet which senses the position (i.e., the horizontal, or x coordinate and the vertical, or y coordinate) of the tip of a stylus, and transmits that information to a digital storage device (e.g., a digital computer). Preferably, such means are also capable of sensing, and transmitting data representing, the stylus pressure (exemplarily by means of a pressure transducer in the stylus), or otherwise indicating when the stylus is in effective contact with the tablet ("pen down" position) and when it is not ("pen up" position). One suitable stylus-tablet inputting apparatus is described in co-pending U.S. patent application Ser. No. 635,086, filed on Feb. 28, 1990.

Significantly, the position and pressure data are not stored as continuous functions. Instead, those data are sampled at intervals, exemplarily equal time intervals at a rate of 300 samples per second, and stored, e.g., as arrays of discrete values.

It is advantageous to smooth the raw $x(t)$ and $y(t)$ data for each signature by means, for example, of a cross-validated cubic spline. The same smoother should be fitted to both the $x(t)$ and $y(t)$ data, in order to assure that the operation of smoothing will commute with rotation operations. Preferably, the smoothing step also includes closing gaps in the signature. That is, each point at which a "pen up" is detected is connected to the next "pen down" point by, e.g., linear interpolation. The (scalar) speed function $v(t)$ is calculated for the smoothed signature.

The speed function is used for comparing signatures, and also for segmenting signatures. The speed function is particularly useful for segmentation because points of low speed in signatures generally correspond to points of high curvature, which mark convenient division points between word features. (Word features are hereafter referred to as "letters," although in practice they do not necessarily correspond to actual letters of the alphabet.)

The mathematical technique of dynamic time warping (DTW) is advantageously used to compare the speed functions of signatures. DTW is used to obtain a non-linear transformation between a pair of speed signals. The transformation consists of locally changing the scale of the time axis of one signal relative to the other in order to minimize the distance between the two signals. The distance in this regard is exemplarily the least-square error summed over the transformation path. The transformation path represents the point correspondence established between the two signals.

DTW methods are described in M. Hanan, et al., "Finite State Machine Decision Procedure Model for Signature Verification," *IBM Tech. Discl. Bull.* 20 (1978), pp. 3355-3360, M. Yasuara, et al., "Signal Verification Experiment Based on Non-Linear Time Alignment," *IEEE Trans. Sys. Man Cybernetics* 17 (1977), pp. 212-216, and D. Sankoff and J. B. Kruskal, eds. "Time Warps, String Edits, and Macromolecules: The Theory and Practice of Sequence Comparison," Addison-Wesley, 1983, pp. 125-160.

When a user is establishing his authorization as an entrant, he enters a set of at least two sample signatures. In fact, it is desirable for him to enter at least 5 signatures, and even as many as 10 or more. The total number of sample signatures that are entered is here referred to as n. (The number n is, of course, a positive integer.) Of the n sample signatures, one "most typical" sample signature is selected. The most typical signature is that signature having a minimal distance from the other signatures in the set, according to an appropriate standard of distance in the speed domain. An exemplary standard is obtained from the least-square error discussed above. The least-square error is determined for each pair of signatures in the sample set. The distance measure (for determining how typical a given signature is) is then obtained by summing the n−1 least-square errors between the given signature and each of the other signatures in the set. The most typical signature (hereafter, the "first reference signature") is that signature for which such sum is minimal over the sample set.

The first reference signature is segmented into letters on the basis of the speed function v(t) for that signature. Significantly, the speed function is not averaged over the sample set, but rather is derived only from the smoothed x(t) and y(t) data for the first reference signature. The segmentation process is carried out such that a break between letters is imposed wherever v(t) is locally relatively small. As a result of segmenting the first reference signature, a set of break points is obtained such that each letter of the signature extends between a pair of break points. (Of course, such a definition of break points includes not only intermediate points, but also the end points of continuous strokes.)

The other n−1 sample signatures are segmented according to the segmentation of the first reference signature. That is, DTW is used to map the first reference signature onto each of the other signatures in the sample set. As a consequence of such mapping, a set of break points is identified for each sample signature. Each such set of break points is the image, under the mapping, of the break points of the first reference signature.

An appropriate mapping is readily achieved, for example, by reparametrizing x(t) and y(t) for each of the sample signatures. That is, according to well-known principles of DTW, the time variable t is replaced by a universal parameter u, which is related to t through a time-warping function which is related to the handwriting speed and is generally different for each sample signature. That is, for the i-th sample signature, $u = h_i(t_i)$, where $t_i$ is the relevant time variable, and $h_i$ is the corresponding time-warping function. With regard to the first reference signature, the function h is preferably the identity function, such that $u = t$.

It will be readily apparent that the break points of the first reference signature can be assigned coordinates $u_1$, $u_2$, $u_3$, ..., with reference to the universal parameter. The other n−1 signatures are broken at the points having the same u values.

As a consequence of segmenting all n sample signatures, a sample set of size n is created for each individual letter. In order to create a mean signature, hereafter referred to as the "second reference signature," the n sample letters in each such set are used to construct a mean (or "reference") letter. Such a construction is carried out using an eigenvalue decomposition scheme for shape analysis. That step is here referred to as "affine invariant averaging" for reasons to be explained below.

The reference letter is constructed such that it has a minimum least-squares distance to the corresponding sample letters, allowing for affine transformations. (An affine transformation is a combination of scale, shear, and rotation transformations, representable, in two dimensions, as a product of a 2×2 lower triangular matrix for scale and shear, times a 2×2 unitary matrix for rotation.) It should be noted in this regard that the affine transformations generally vary with position along the signature; i.e., they are functions of u. However, we have found that it is generally sufficient to treat the affine transformations as piecewise constant; that is, we treat them as u-independent over each individual letter, but we allow them to vary between letters.

Mathematically, affine invariant averaging can be separated into two stages. In the first stage, the mean letter is assumed known. For each of the sample letters, in turn, the affine transformation that operates on that letter is permitted to range freely over the space of 2×2 matrices until it assumes the value that minimizes the distance between the instant sample letter and the mean letter. This stage of the analysis produces a mathematical expression for each of the n minimizing transformations in terms of the corresponding sample letter (which is known) and in terms of the mean letter (which is unknown). The first stage also produces a distance function, in the same terms, which is the sum of the squared distances between the mean letter and each of the optimally transformed letters.

The second stage of affine invariant averaging is to solve for the value of the mean letter that minimizes the distance function, subject to an appropriate constraint. The problem is a well known eigenvector problem, and the solution is readily obtained.

The second reference signature, or "template," comprises the mean letters that are calculated as described above.

When a new signature arrives for verification, a similar sequence of steps takes place, only much simpler. It gets smoothed and its speed signal is computed. This speed signal is then time warped against the speed signal for the template signature, and the correspondence is established. Typically a forgery can be identified at this stage because of the large speed distance reported by the time warping procedure. If not, the new signature is segmented, affinely transformed to match the template, and least square distances are computed on a letter basis between the two. These distance statistics can be compared to the n similar distances for the original signatures from the template. It is extremely unlikely that a forger can mimic both the shape and relative speed with which a person signs his name.

The steps of the invention are broadly depicted in FIG. 1. With reference to the figure, the steps can be grouped into an "initialization" stage and a "recognition" stage.

In the initialization stage, an authorized entrant writes out a set of sample signatures using appropriate means (step 5). The signatures are digitally stored (step 10). Based on the speed signal, a most typical signature is selected and segmented (step 15). Each remaining signature is segmented by mapping onto it the segmentation of step 15 (step 20). Finally, an average signature is constructed letter-by-letter, using the segmentation of steps 15 and 20 (step 25).

In the recognition stage, an entrant (whose authorization is generally unknown, a priori) writes out a signature using appropriate means (step 30), which is digitally stored (step 35) and segmented by mapping onto it the segmentation of step 15 (step 40). The speed signal of the signature being recognized is compared with the speed signal of the "most typical" signature of step 15, resulting in the calculation of a dynamic mismatch (step 45). On a letter-by-letter basis, the signature being recognized is compared with the average signature of step 25, resulting in the calculation of a shape mismatch (step 50). The dynamic and shape mismatch values are compared with a predetermined selection criterion and a decision is made whether or not to accept the signature (step 55). Upon acceptance, an electric circuit is activated such that access is given (step 60).

DETAILED DESCRIPTION OF A PREFERRED EMBODIMENT

Figure 1:
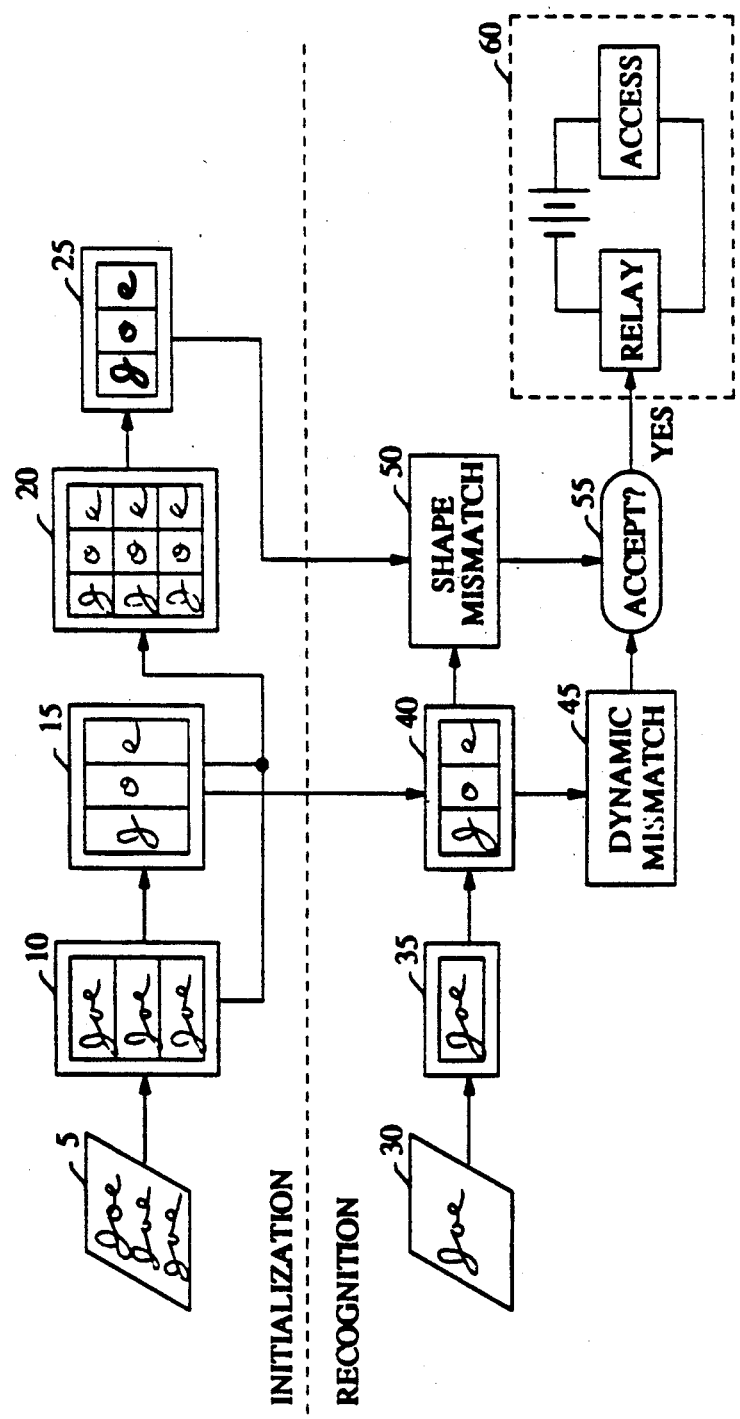
FIG. 1 is a flowchart illustrating the inventive steps in a broad sense.
Figure 2:
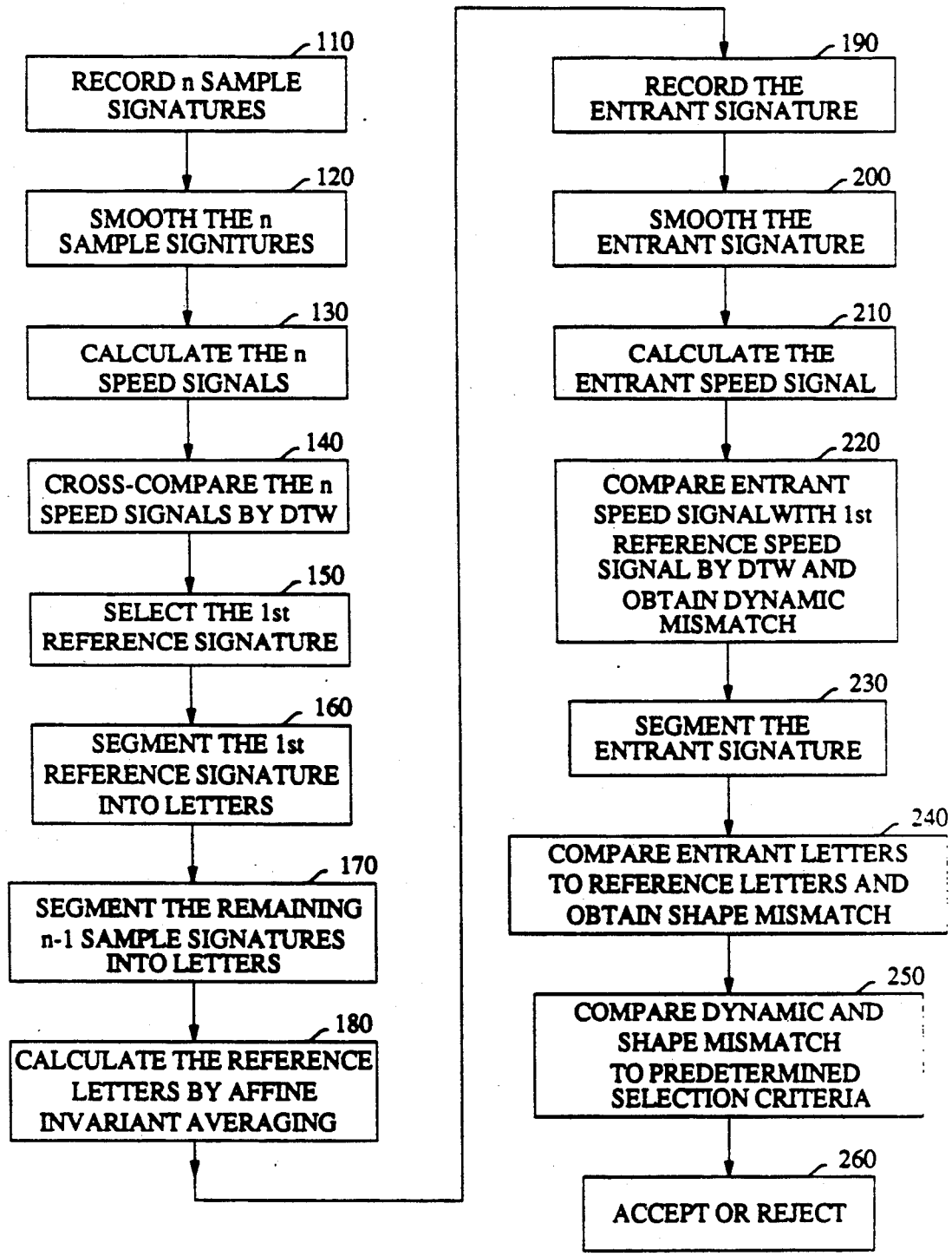
FIG. 2 is a flowchart illustrating the steps performed in verifying a signature, according to one embodiment of the invention.

A currently preferred method of practicing the inventive method is described below, with reference to FIG. 2.

A system is provided, which is capable of offering access to, or withholding access from, a human being, here referred to as an "entrant". If, for example, the system is an automated bank teller machine, such access is the ability of the entrant to conduct a banking transaction using the system. Access is exemplarily provided by activating an electric circuit which controls the system such that it can conduct a transaction. (Such activation of an electric circuit may, e.g., comprise setting a digitally stored value, or "flag," in a digital memory.) Other forms of "access" that may be provided by activating an electric circuit will be readily apparent, and include, e.g., deactivation of a physical locking mechanism, or setting a digitally stored value such that a computer or computer terminal will subsequently respond to the entrant's commands.

In order to have access, a user will initially need to establish his authority to use the system. According to the invention, such authority is established by storing information regarding the entrant's signature in a database, such that subsequently entered signatures can be compared against the stored data and accepted or rejected based on their similarity or dissimilarity to the authorized signature.

Referring to the figure, in step 110, authority is initially established by the entry of a set of n sample signatures by an authorized entrant. The n signatures are digitally recorded by appropriate means, as discussed above.

Each signature is recorded as a sequence of x-y coordinate pairs recorded at a uniform frequency of, e.g., about 300 points per second. Along with the spatial coordinates, a third coordinate, pressure p, is recorded at the same time points. As noted, the pressure signal is useful for detecting when the stylus is raised from the tablet.

Although the recorded data are typically smooth, there are occasional gross outliers and noisy points which need to be removed (typically, less than 1% of the total). These are easily identified by their large euclidean distance from the neighboring points.

In step 120, a smooth path is then constructed through the remaining x and y coordinates for each word in each signature. This is preferably done by smoothing each coordinate separately against time using a cubic smoothing spline.

The amount of smoothing is chosen automatically by global cross-validation of the integrated Euclidean distance between the observed and fitted points. Typically very little smoothing is performed, and the fitted curves usually come close to interpolating the observed sequences. There are three reasons for smoothing the signature sequences in this way: (1) even though the amount of smoothing is small, it tends to eliminate small discontinuities introduced by measurement error due to the discretization during the recording process, or small movements during the signing; (2) the cubic spline representation turns the sequence into a function that can be evaluated at any point t (this is convenient for purposes of subsequent steps); and (3) the cubic spline has two continuous derivatives, the first of which is used in the speed computation.

If the observed signature sequence is denoted by $$X_i, i=1,\ldots,N$$

measured at time points $t_i$, then the smoothed signature $S(t)$ minimizes the criterion $$\sum_{i=1}^{N} \|X_i - S(t_i)\|^2 + \lambda \int \|S''(t)\|^2 dt$$

over a suitable Sobolev space of functions, and for some value of the smoothing parameter $\lambda$. The solution varies dramatically with the value of the smoothing parameter, which has to be supplied. It is desirable to use the cross-validated integrated Euclidean squared distance $$CV(\lambda) = \sum_{i=1}^{N} \|X_i - S_{(i)}^{\lambda}(t_i)\|^2$$

as a criterion for selecting $\lambda$. Here $$S_{(i)}^{\lambda}(t_i)$$

is the value of the smooth curve evaluated at $t_i$; the subscript (i) indicates that the i-th point itself was omitted in the fitting of the curve. This criterion is desirable because it recognizes the signal in the signature, and selects a value for $\lambda$ such that only enough smoothing is performed to eliminate the small amount of measurement error.

In step 130, a time-dependent speed signal is calculated for each of the n smoothed sample signatures. As noted, appropriate speed signals are generated by the exemplary smoothing method.

In step 140, the n smoothed speed signals are cross-compared using a dynamic time warping (DTW) method, and preferably a symmetric DTW method.

According to the preferred method, each pair of speed signals is evaluated on a grid of time points (e.g., a grid with resolution 5 times the recording time interval). This results in two sequences $v_{1i}$ and $v_{2i}$, of lengths $n_1$ and $n_2$. Typically the $n_j$ are within 15% of each other. The goal of the algorithm is to find a sequence-correspondence mapping between the two signals. This correspondence-mapping is denoted by a sequence of ordered pairs (j,k).

The currently preferred symmetric DTW algorithm is a basic one. Given a correspondence (i,j) between $v_{1i}$ and $v_{2j}$, allowable future correspondences include those between $v_{1,i+1}$ and $v_{2,j}$, $v_{1,i+1}$ and $v_{2,j+1}$, and $v_{1,i}$ and $v_{2,j+1}$. As a global constraint, there is an enforced correspondence between sequence values (1,1) and $(n_1,n_2)$. The desired overall correspondence is determined using dynamic programming to minimize the total weighted least-squared error between the speed signal over the correspondence path, allowing for local scale adjustment. Each pair (i,j) therefore has a scaled squared distance associated with it, and these are simply added over the path. These squared distances in the instant case are simply $(v_{1i}-v_{2j})^2$ adjusted in two ways:

(1) The distances associated with correspondences of the form $(i+1,j)$ or $(i,j+1)$ are weighted by a factor 0.5, while those of the form $(i+1,j+1)$ are not, during the computation of the weighted least-squared error. This weighting guarantees that correspondence paths which traverse routes such as $(i,j) \rightarrow (i+1,j) \rightarrow (i+1,j+1)$ or $(i,j) \rightarrow (i,j+1) \rightarrow (i+1,j+1)$ will not be penalized relative to the direct path $(i,j) \rightarrow (i+1,j+1)$.

(2) The speed signals are initially scaled to lie in (0,1). Furthermore, a local rescaling takes place before distances are computed: in effect one entire speed curve is scaled so that their local means (computed over a window around the target points) coincide, before the distance between the speeds in question is computed. This latter adjustment reflects the fact that the rises and falls of the speed function are useful as a basis for matching, rather than the actual levels attained.

The basic algorithm is advantageously altered by adding additional local constraints, which prohibit more than one horizontal or vertical move in a row. The purpose of these local constraints is to prevent the mapping of a single time instant in one signal to many time instants in the other signal. In particular, having these restrictions allows for much improved segmentation and shape analysis due to the fact that the mapping function does not distort the original functions to the same degree as in the case of warping without local constraints.

As a result of step 140, a "most typical" signature (with respect to the speed signal) is readily identified (step 150). Such signature is hereafter referred to as the "first reference signature."

In step 160, the first reference signature is segmented at regions of low speed (which generally correspond to regions of relatively high curvature). The lower speed threshold is chosen to be 15% of the mean speed, and the portion of the signature associated with the local minima below this threshold are removed during the segmentation. This has little spatial consequence, since by definition points of low speed are close together in space. The skilled practitioner can readily implement a dynamic modification to this 15% threshold, which checks if any new local minima are discovered between the 15% and (15+1)% threshold; if so the threshold is incremented to 16% and the step is repeated. In practice this results in thresholds between 15%–18%, and it makes the segmentation process more stable. Once the segmentation has been performed for the first reference signature (step 160), it is automatically defined for all the other signatures (step 170) because of the correspondences. Each of the segments is herein referred to as a "letter". Although in many cases such segments may happen to correspond to alphabetic letters, this is not a requirement.

In step 180, each of the reference letters $\overline{L}$ is calculated by averaging the n smoothed sample letters $L_j$. For each letter, each of the $L_j$ is an $m \times 2$ matrix representing one of the n different versions of that letter. There is a correspondence between each of the rows of the matrices. The method to be used for averaging the sample letters is affine invariant averaging. According to that method, the reference letter $\overline{L}$ is defined as the minimizer of the distance function $$\sum_{j=1}^{n} \| L_j B_j - \overline{L} \|^2$$

over $\overline{L}_{m \times 2}$ and $B_j$. Measurement errors are assumed small, and are assumed to average out to negligible values. The sample letters are mutually aligned (relative to shifts of position) using the centroid of each of the $L_j$ for reference.

The $B_j$ are general, non-singular transformations, which can be represented as $2 \times 2$ matrices. An appropriate constraint should be imposed to avoid degeneracies. A useful constraint for that purpose requires $\overline{L}^T \overline{L} = I$, although other equivalent constraints are possible.

If $L_j = Q_j R_j$ is the Q-R decomposition of the jth letter, then it is apparent that the optimal $B_j$ is given by $B_j = R_j^{-1} Q_j^T \overline{L}$ and hence $L_j B_j = Q_j Q_j^T \overline{L}$. Consequently, at the minimum, the distance function is $$\sum_{j=1}^{n} \| (Q_j Q_j^T - I) \overline{L} \|^2 = \sum_{j=1}^{n} tr(\overline{L}^T M_j \overline{L}) = n \cdot tr(\overline{L}^T \overline{M} \overline{L})$$

where $\overline{M}$ is the average of the residual projection operators $M_j = (I - Q_j Q_j^T)$. Since each of the $M_j$ are symmetric and nonnegative, so is $\overline{M}$. Now minimizing $tr(\overline{L}^T \overline{M} \overline{L})$ subject to $\overline{L}^T \overline{L} = I$ is a well known eigenvector problem, with solution $\overline{L}$ being a basis for the eigenspace corresponding to the two smallest eigenvalues of $\overline{M}$. Since each of the projection operators $Q_j Q_j^T$ has eigenvalues of zero or one, their average $\overline{P}$ has eigenvalues in [0,1], and thus the solution also corresponds to the two largest eigenvalues of $\overline{P}$.

The solution $\overline{L}$ is a matrix, and represents the average letter at time points implicit for each row of the individual letters $L_j$. In practice, it is necessary to represent the letter as a function. A simple solution that is advantageously adopted is to smooth the average using the cubic smoothing spline smoother discussed above.

Although each of the individual signatures is smooth, it may happen that the affine invariant average is not as smooth. One can impose a smoothness penalty on the distance function by adding a quadratic roughness penalty of the form $\lambda tr \overline{L}^T \Omega \overline{L}$. A natural candidate for $\Omega$ is the integrated seconds squared derivative matrix corresponding to a smoothing spline. In this case the solution is a basis for the eigenspace corresponding to the two smallest eigenvalues of $n\overline{M} + \lambda \Omega$. In practice, the unconstrained solutions are smooth enough not to require this additional constraint. Of course the simpler but less elegant solution is to once again smooth the columns of $\overline{L}$.

When a prospective entrant seeks access to the system, a sequence of steps analogous to the above-described steps is performed. In step 190, the entrant's signature is digitally recorded. In step 200 the signature is smoothed, and in step 210 the speed signal is calculated, using the smoothing method described above. In step 220, symmetric DTW is used to compare the speed signal of the entrant signature with that of the first reference signature. As a consequence, a distance value is obtained. Such value is here referred to as the "dynamic mismatch". In step 230, the entrant signature is segmented into entrant letters with reference to the first reference signature, as described above. In step 240, each of the entrant letters is compared to the corresponding reference letter using affine invariant averaging to obtain a value for the distance function, here referred to as the "shape mismatch".

In step 250, the dynamic mismatch and the shape mismatch are compared to predetermined criteria. In step 260, a decision is made, based on the comparison of step 250. Such a decision may be to permit access or to deny access. Alternatively, the decision may be to request additional information, for example, an additional signature.

It should be noted in this regard that it is possible to build some flexibility into the predetermined selection criteria. For example, an acceptance threshold with respect to the dynamic mismatch may be lowered with respect to a particular entrant's signature if such signature shows a relatively high degree of variability in step 140.

We claim:

1. A method for controlling access to a system, the method comprising an initializing step wherein at least one authorized signature is recorded and a recognition step wherein an entrant signature is compared to the authorized signature, wherein:

the initializing step comprises the steps of:
a) digitally recording a multiplicity of authorized sample signature received from digitizing means;
b) calculating a speed function corresponding to each sample signature, performing pairwise comparisons of the speed functions by applying dynamic time warping (to be referred to as "DTW"), and selecting that signature, to be referred to as a "representative signature," which is most typical according to the DTW calculations;
c) segmenting the representative signature into individual word features, to be referred to as "letters", based on relatively small local values of the speed function;
d) segmenting each of the remaining sample signatures into letters by mapping thereupon the segmentation of the representative signature by DTW, such that there is a correspondence between the letters of each pair of segmented sample signatures; and
e) constructing a reference signature by averaging each set of corresponding letters from the sample signatures; and the recognition step comprises the steps of:
f) digitally recording an entrant signature received from digitizing means;
g) calculating a speed function for the entrant signature, and segmenting the entrant signature into letters by mapping thereupon the segmentation of the representative signature by DTW such that there is a correspondence between the letters of the entrant signature and the letters of the reference signature;
h) calculating a dynamic mismatch between the entrant signature and the representative signature by DTW;
i) calculating a shape mismatch, totalled over all the relevant letters, between the entrant signature and the reference signature;
j) comparing the dynamic and shape mismatch values to a predetermined acceptance criterion; and
k) if the acceptance criterion is satisfied, activating an electric circuit such that access to the system is made available.

2. The method of claim 1, wherein (e) comprises constructing a reference signature by affine invariant averaging of each set of corresponding letters from the sample signatures; and (i) comprises calculating the shape mismatch by affine invariant averaging.

3. A method for controlling access to a system which comprises verifying that an entrant signature is an authorized signature, the method comprising:
a) digitally recording a sample set of n sample signatures made by an authorized entrant, n a positive integer at least equal to 2, each sample signature being received from digitizing means, each sample signature being described as a time-dependent vector function (x(t), y(t)), and the recording step resulting in a digitally stored record of the time-dependent functions x(t) and y(t), where x and y refer to mutually orthogonal positions on a planar surface, and t refers to time;
b) for each sample signature, calculating a time-dependent speed function v(t) from the stored record;
c) comparing the speed function of each sample signature with the speed function of each of the other sample signatures using dynamic time warping, resulting in the selection of a most typical sample signature with respect to the function signal, the selected signature to be referred to as the "first reference signature";
d) segmenting the first reference signature into individual features to be referred to as "letters", the breaks between letters being associated with relatively small local values of v(t);
e) mapping the first reference signature onto each of the other n−1 sample signatures with the use of dynamic time warping such that each break between letters of the first reference signature is associated with a corresponding break point on each of the other sample signatures;
f) segmenting each of the other n−1 sample signatures according to the corresponding break points, leading to a sample set of size n for each letter;
g) applying affine invariant averaging to each letter sample set such that a reference letter corresponding to that set is created, all of the reference letters together constituting a second reference signature;
h) digitally recording x(t) and y(t) of the entrant signature, and calculating a corresponding time-dependent speed function v(t);
i) comparing v(t) of the entrant signature with v(t) of the first reference signature using dynamic time warping, such that a dynamic mismatch value is calculated;
j) segmenting the entrant signature by mapping the first reference signature onto it using dynamic time warping and breaking it into entrant letters at the points corresponding to the break points of the first reference signature;
k) comparing each entrant letter with the corresponding reference letter, the comparison performed using affine invariant averaging and resulting in a shape mismatch value for the entrant signature;
l) comparing the shape mismatch value and the dynamic mismatch value with a predetermined selection criterion such that for certain shape and dynamic mismatch values, the entrant signature is accepted as an authorized signature, and for certain other shape and dynamic mismatch values, the entrant signature is rejected; and m) if the entrant signature is accepted, activating an electric circuit such that access to the system is made available.

4. The method of claim 3, wherein:

associated with each sample signature and the entrant signature is a time-dependent stylus pressure signal received from the digitizing means;

step (a) further comprises digitally recording the pressure signal of each sample signature;

and the method further comprises, after receiving each of the sample signatures and the entrant signature, the step of closing gaps in the received signature by performing interpolation between each point where the pressure signal indicates "pen up" and the next point where the pressure signal indicates "pen down."

5. An access-controlled system which comprises:

a) means for digitizing a multiplicity of handwritten, human signatures, such that for each signature, a digital signal is produced that represents the signature as a time-dependent vector function (x(t), y(t)), the multiplicity of signatures to include at least two sample signatures from an authorized person and an entrant signature;

b) means for digitally storing the time-dependent vector functions;

c) means for digitally processing at least some of the stored time-dependent vector functions, said means comprising: means for calculating a time-dependent speed function v(t) from each stored function; means for comparing each pair of speed functions by dynamic time warping such that a dynamic mismatch is calculated; means for selecting a most typical speed function; means for segmenting the signature (to be referred to as the "first reference signature") that corresponds to the most typical speed function, such segmentation to be carried out with reference to relatively small local values of v(t), each of the resulting segments to be referred to as a "letter"; means for mapping the first reference signature, by dynamic time warping, onto each of the other signatures whose corresponding stored functions are being processed, such that each break between letters of the first reference signature is associated with a corresponding break point on each of the other signatures; and means for segmenting each of the other signatures according to the corresponding break points;

d) digital processing means for applying affine invariant averaging to a multiplicity of corresponding letters, such that the processing of each pair of letters results in the calculation of a shape mismatch, and the letter-by-letter processing of the sample signatures results in the construction of a second reference signature;

e) digital processing means for comparing a predetermined selection criterion to the dynamic mismatch between the entrant signature and the first reference signature, and to the shape mismatch, totalled over all corresponding letters, between the entrant signature and the second reference signature; and f) means, responsive to the comparison means, for permitting access to the system if the selection criterion is satisfied.

6. An access-controlled system which comprises:

a) means for digitizing a multiplicity of handwritten, human signatures, such that for each signature, a digital signal is produced that represents the signature as a time-dependent vector function (x(t), y(t)), the multiplicity of signatures to include at least two sample signatures from an authorized person and an entrant signature;

b) means for digitally storing the time-dependent vector functions;

c) means for digitally processing at least some of the stored time-dependent vector functions, said means comprising: means for calculating a time-dependent speed function v(t) from each stored function; means for comparing each pair of speed functions by dynamic time warping such that a dynamic mismatch is calculated; means for selecting a most typical speed function; means for segmenting the signature (to be referred to as the "first reference signature") that corresponds to the most typical speed function, such segmentation to be carried out with reference to relatively small local values of v(t), each of the resulting segments to be referred to as a "letter"; means for mapping the first reference signature, by dynamic time warping, onto each of the other signatures whose corresponding stored functions are being processed, such that each break between letters of the first reference signature is associated with á corresponding break point on each of the other signatures; and means for segmenting each of the other signatures according to the corresponding break points;

d) digital processing means for averaging each set of corresponding letters from the sample signatures, the letter-by-letter processing of the sample signatures resulting in the construction of a second reference signature;

e) means for calculating a shape mismatch, totalled over all the relevant letters, between the entrant signature and the second reference signature;

f) digital processing means for comparing a predetermined selection criterion to the dynamic mismatch between the entrant signature and the first reference signature, and to the shape mismatch between the entrant signature and the second reference signature; and g) means, responsive to the comparison means, for permitting access to the system if the selection criterion is satisfied.

* * * * *